(No Model.)
C. S. BEEBE.
WAGON GEAR.
No. 413,888. Patented Oct. 29, 1889.
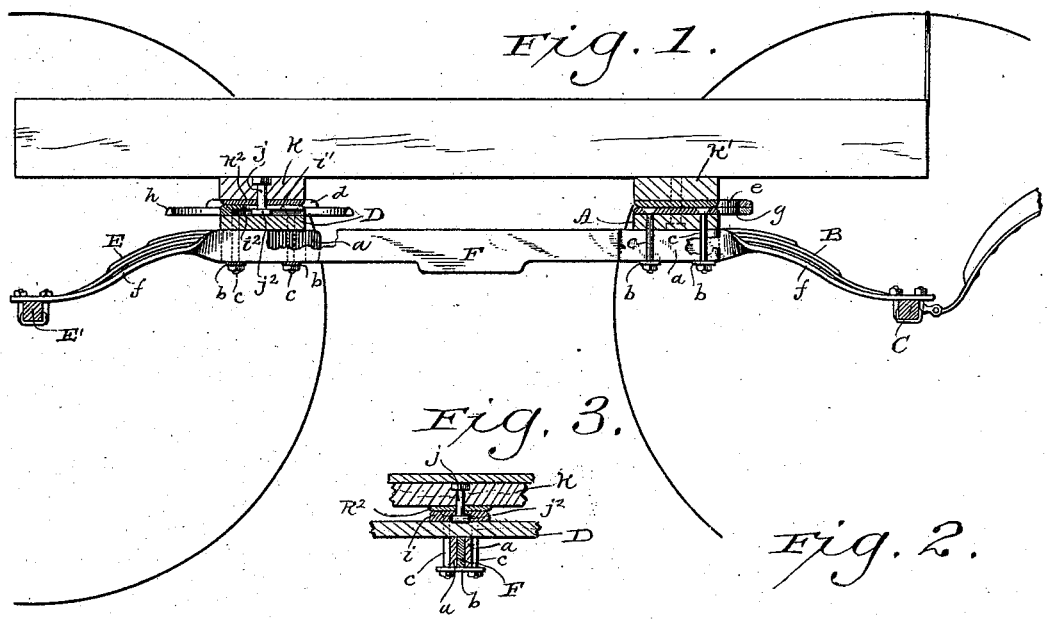
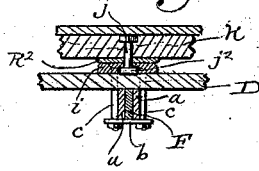
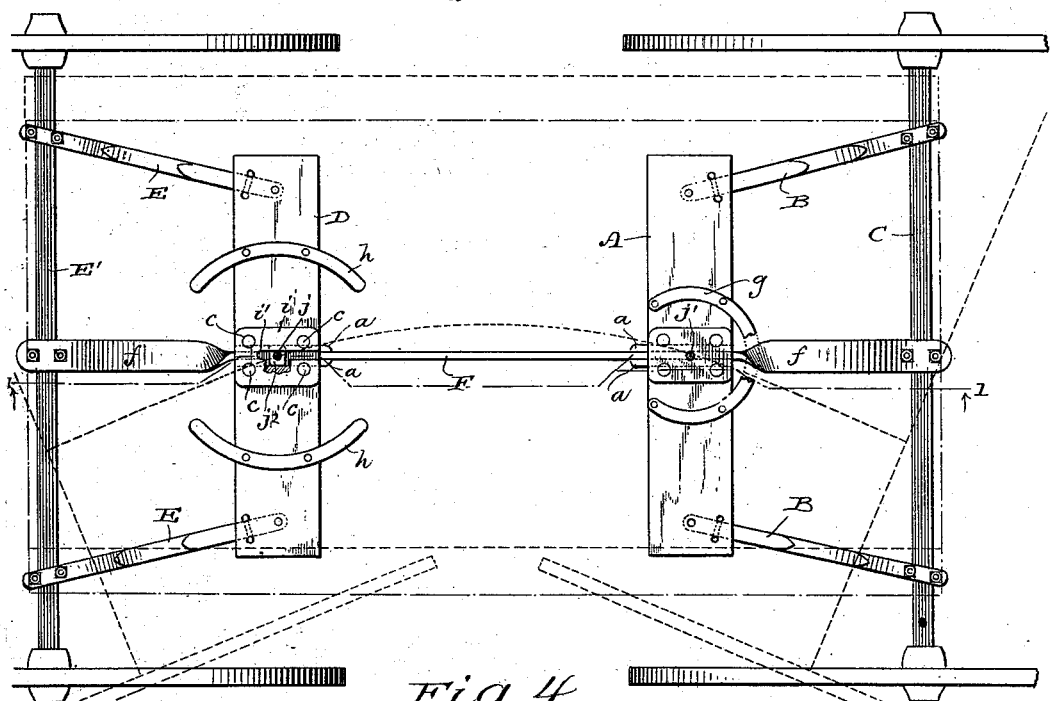
Witnesses
Geo. W. Young.
Wm Klug
Inventor
Charles S. Beebe
By Stout & Underwood
Attorneys

UNITED STATES PATENT OFFICE.

CHARLES S. BEEBE, OF RACINE, WISCONSIN.

WAGON-GEAR.

SPECIFICATION forming part of Letters Patent No. 413,888, dated October 29, 1889.

Application filed December 11, 1888. Serial No. 293,310. (No model.)

*To all whom it may concern:*

Be it known that I, CHARLES S. BEEBE, of Racine, in the county of Racine, and in the State of Wisconsin, have invented certain new and useful Improvements in Wagon-Gears; and I do hereby declare that the following is a full, clear, and exact description thereof.

My invention relates to wagon-gearing, and will be fully described hereinafter.

In the drawings, Figure 1 is a longitudinal vertical section through a gearing embodying my invention on the line 1 1, Fig. 2; and Fig. 2 is a plan of the same, portions being broken away in both views to better illustrate the construction. Figs. 3 and 4 are details.

A is the front platform of the gear, which is supported by suitable springs B, that are clipped to the front axle C and project inwardly and upwardly therefrom.

D is the rear platform, that is supported by similar springs E, clipped to the rear axle E′ in like manner to those in front.

F is the reach, which is made of steel or other flexible material, and may extend from one axle to the other, as shown in the drawings, or its extensions $f$ may be divided from it and their inner ends clipped to the respective platforms. In the preferred form, which is shown, the portion of the reach between the platforms is arranged vertically—that is, is of greater vertical than horizontal width—and the extensions $f$ are given a quarter-turn, so that the greatest width is at right angles to that of the reach proper. That portion of the reach that is covered by a platform is tightly clamped between jaws $a\,a$, that are clipped to the platform by plates $b$ and bolts $c$; or the connection may be made in any other secure manner.

The body of the wagon is provided with pillow-blocks $k$ and $k'$, carrying bearing-segments $d$ and $e$, that rest on like segments $h$ and $g$ on the respective platforms D and A. A plate $i$ is secured to the upper side of the rear platform D, and this plate is slotted, as shown at $i'$, to receive the lower end of the rear king-bolt $j$, which depends from the body or rear pillow-block $k$ (passing through a rub-plate $k^2$, fast on the under side of said pillow-block $k$ inside the segment $d$) and slides in said slot $i'$, the lower head $j^2$ of said bolt $j$ moving beneath the slotted edges of this plate $i$ in a groove $i^2$, formed in the under surface of the plate $i$, as shown, or in the upper surface of the platform D, the said bolt $j$ forming the connection between the rear gear and body. The front platform A and body are pivotally connected by an ordinary king-bolt $j'$.

The dotted lines, Fig. 2, show the position of the wheels on one side when the wagon is cramped or being turned.

A wagon provided with my gear can be made with a much wider body than those with rigid reaches, and yet a much shorter turn can be made with my gear, as the turning of the front gear acts through the reach to give a corresponding turn to the rear gear, and at the same time to throw the body to one side and out of the way of the wheels, the sliding connection between the body and the rear platform allowing for the lengthening and shortening of the reach as it bends and straightens, and permitting the said body to be moved sidewise both in front and rear equally.

Having thus fully described my invention, what I claim as new, and desire to secure by Letters Patent, is—

1. The combination, with the front and rear gear of a wagon, of an elastic reach and pivotal connections between the front gear and the body, and pivotal and sliding connections between the rear gear and the body.

2. The combination, with the front and rear axles of a wagon, of an elastic reach and front and rear pivotal connections between the said axles, substantially as set forth.

3. The combination, with a wagon-body and its front and rear gear, of an elastic reach having pivotal connections with each gear, whereby the said body may be moved sidewise both in front and rear equally.

In testimony that I claim the foregoing I have hereunto set my hand, at Racine, in the county of Racine and State of Wisconsin, in the presence of two witnesses.

CHARLES S. BEEBE.

Witnesses:
JAMES E. BUSH,
S. S. STOUT.